US008176611B1

(12) United States Patent
Waisanen

(10) Patent No.: US 8,176,611 B1

(45) Date of Patent: May 15, 2012

(54) PIN CHANGING DEVICE AND METHOD

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 0 days.

(21) Appl. No.: 12/485,244

(22) Filed: Jun. 16, 2009

Related U.S. Application Data

(62) Division of application No. 11/032,529, filed on Jan. 10, 2005, now Pat. No. 7,562,430.

(51) Int. Cl.

| | |
|---|---|
| ***B25B 27/14*** | (2006.01) |
| ***B66C 23/26*** | (2006.01) |
| *B23P 6/00* | (2006.01) |

(52) U.S. Cl. ........... 29/281.5; 29/256; 29/263; 212/175; 212/177

(58) Field of Classification Search .................... 29/252, 29/256, 257, 258, 259, 260, 261, 262, 263, 29/281.5; 212/175, 177; 254/402, 403

See application file for complete search history.

(56) References Cited

U.S. PATENT DOCUMENTS

| | | | | |
|---|---|---|---|---|
| 1,227,457 | A * | 5/1917 | Langan | 29/259 |
| 1,394,129 | A * | 10/1921 | Wickersham | 29/261 |
| 3,059,327 | A | 10/1962 | Burrows | |
| 3,427,726 | A | 2/1969 | Fleissner | |
| 4,184,600 | A | 1/1980 | Goss et al. | |
| 4,235,004 | A * | 11/1980 | Floyd | 29/256 |
| 4,287,651 | A | 9/1981 | Cilderman et al. | |
| 5,058,256 | A | 10/1991 | Taylor et al. | |
| 5,257,445 | A * | 11/1993 | Mayberry | 29/261 |
| 5,649,635 | A | 7/1997 | Casavant et al. | |
| 6,085,419 | A | 7/2000 | Poitras | |
| 6,266,860 | B1 | 7/2001 | Kiebler | |
| 6,748,637 | B2 | 6/2004 | Meggiolan | |
| 7,082,747 | B2 | 8/2006 | Oishi et al. | |
| 7,562,430 | B2 * | 7/2009 | Waisanen | 29/281.5 |
| 2007/0193247 | A1 | 8/2007 | Daniels et al. | |

FOREIGN PATENT DOCUMENTS

| | | |
|---|---|---|
| GB | 2084502 A | 4/1982 |

* cited by examiner

*Primary Examiner* — Essama Omgba

(74) *Attorney, Agent, or Firm* — Porter, Wright, Morris & Arthur, LLP

(57) ABSTRACT

A pin removal assembly for use with an upper block of a crane includes a sheave support and a pin support. The upper block includes a frame, a plurality of sheaves, and a removable sheave pin that defines and axis of rotation for the sheaves and supports the sheaves within the frame. The pin removal assembly includes a sheave support mountable to the frame of the upper block and a pin support mountable to the frame of the upper block. The pin support is configured to support the sheave pin when the sheave pin is removed from the upper block.

6 Claims, 2 Drawing Sheets

PIN CHANGING DEVICE AND METHOD

CROSS REFERENCE TO RELATED APPLICATIONS

This is a divisional application of U.S. patent application Ser. No. 11/032,529 filed on Jan. 10, 2005, now U.S. Pat. No. 7,562,430, the disclosure of which is expressly incorporated herein in its entirety by reference.

BACKGROUND

The present invention relates to overhead cranes and particularly to upper blocks of overhead cranes. More particularly, the present invention relates to the main support pin in an upper block of an overhead crane.

Conventional overhead cranes include a wire rope that is reeved between an upper block and a lower block. The upper block typically includes multiple sheaves supported on a main pin and around which the wire rope is reeved. To change the main pin that supports the multiple sheaves, the wire rope typically must be unreeved from the upper block sheaves and the lower block sheaves. A device that permits a main pin of an upper block to be changed without unreeving and re-reeving the upper block would be welcomed by users of overhead cranes.

SUMMARY

It is one embodiment, the invention provides a pin removal assembly for use with an upper block of a crane. The upper block includes a frame, a plurality of sheaves, and a removable sheave pin that defines an axis of rotation for the sheaves and supports the sheaves with the frame. The pin removal assembly comprises a sheave support mountable to the frame of the upper block and a pin support mountable to the upper block. The pin support is configured to support the sheave pin when the sheave pin is removed from the upper block.

In another embodiment, the invention provides a pin removal assembly for use with an upper block of a crane. The upper block includes a frame, a plurality of sheaves, and a removable sheave pin that defines an axis of rotation for the sheaves and supports the sheaves with the frame. The pin removal assembly comprises a first support bracket attached to a sidewall of to the upper block frame and a sheave support mountable to the first support bracket. The sheave support includes a base portion configured to support the sheaves and a support arm portion releasable mountable to the first support bracket.

In yet another embodiment, the invention provides an upper block assembly for an overhead crane. The upper block assembly includes an upper block and a pin removal assembly releasable mounted to the upper block. The upper block includes a frame with a first sidewall and a second sidewall, a plurality of sheaves arranged within the frame, and a sheave pin that supports the sheaves within the frame. Each sidewall and each sheave includes a hole therethrough, and the holes defining an axis of rotation and receiving the sheave pin.

In another embodiment the invention provides a method of supporting an upper block of an overhead crane during replacement of the sheave pin. The upper block includes a frame, a plurality of sheaves and a removable sheave pin that defines an axis of rotation from the sheaves and supports the sheaves within the frame. The method includes mounting first and second support brackets to opposite sidewalls of the upper block frame, mounting a sheave support including a base portion to at least one of the support brackets, and positioning the base portion of the sheave support to support each sheave. The method further includes mounting a pin support to the other support bracket located adjacent the sheave pin and sliding the sheave pin from the upper block wherein the pin support supports the sheave pin.

Other features and advantages of the invention will become apparent by consideration of the detailed description and accompanying drawings.

Before the embodiments of the invention are explained in detail, it is to be understood that the invention is not limited in its application to the details of the construction and the arrangements of the components set forth in the following description or illustrated in the following drawings. The invention is capable of other embodiments and of being practiced or being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported." And "coupled" and variations thereof are used broadly and encompass both direct and indirect mountings, connections, supports, and couplings. Further, "Connected" and "couples" are not restricted to physical or mechanical connections or couplings.

DETAILED DESCRIPTION

Figure 1:
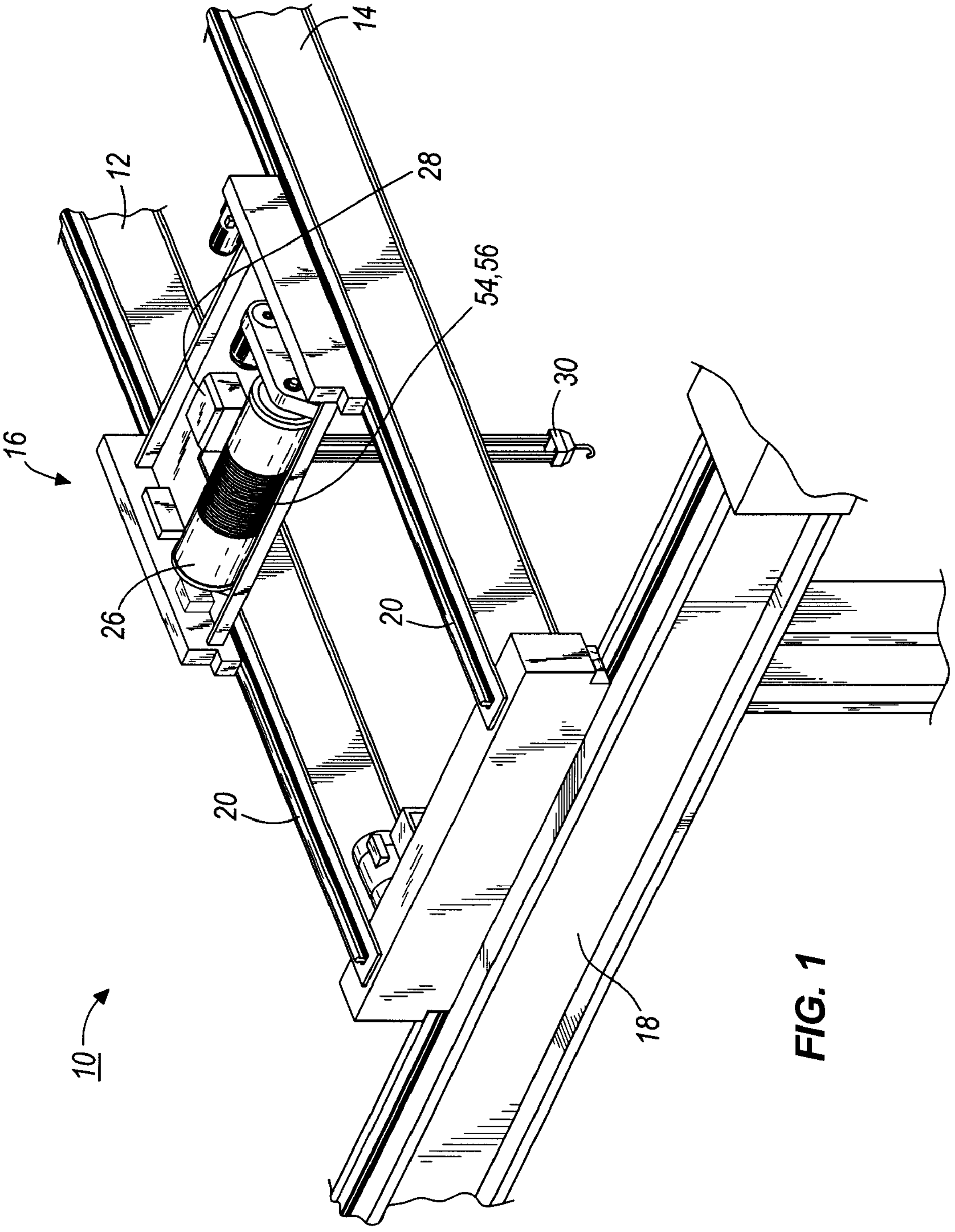
FIG. 1 is a perspective view of a crane including a trolley having an upper block according to the present invention.

In FIG. 1, a crane 10 includes a trolley 16 that moves along girder rails 20 that sit atop a first girder 12 and a second girder 14. The first girder 12 and the second girder 14 translate along a main support beam 18 on one end and an additional support beam (not shown) parallel to beam 18 at an opposite end of the girders. The trolley 16 includes a drum 26 around which is wrapped two wire ropes 54, 56. As the drum 26 rotates and winds up the wire ropes 54, 56, a lower block 30 is lifted, as will be readily apparent to those of skill in the art. As illustrated in FIG. 1, the lower block 30 includes a hook that can be used for lifting. However, the lower block 30 could include other configurations for lifting, as will also be readily to those of skill in the art The translation of the trolley 16 along the first and second girders 12, 14 and the translation of the first and second girders 12, 14 along the main support beams 18 (only one of which is shown), allows the crane 10 to position the lower block 30 in virtually any location in a space in which the crane 10 is installed. The main support beam 18 is shown as a straight beam. As will be readily known to those of skill in the art, the main support beam 18 may alternatively be curved to match the inside wall contours of a round building. For example, a polar crane similar to crane 10, shown in FIG. 1, may be used in a nuclear containment building that is built in a round configuration, in which case the main support beam 18 will be shaped in a circle instead of a straight line.

As shown in FIG. 1, the wire ropes 54, 56 extend from the drum 26 to the lower block 30, which contains a plurality of sheaves (not shown) around which the wire ropes 54, 56 pass. From the lower block 30, the wire ropes 54, 56 extend to an upper block 28 that also contains a plurality of sheaves (not shown). After reeving back and between the lower block 30 and upper block 28, as will be readily understood by those of ordinary skill in the art, the wire ropes 54, 56 end within the upper block 28.

Figure 2:
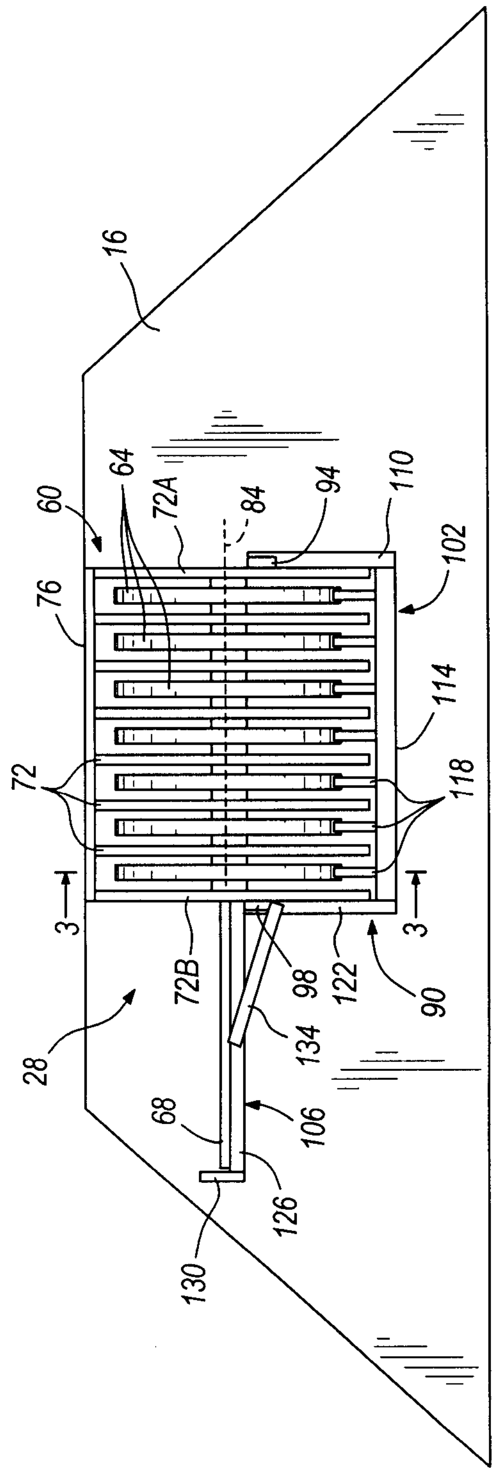
FIG. 2 illustrates a pin removal assembly according to the present invention that is connected to an upper block.

Referring to FIG. 2, the upper block 28 includes an upper block frame 60, a plurality of sheaves 64 arranged within the frame 60, and a sheave pin 68 that supports the sheaves 64 within the frame 60. The frame 60 illustrated in FIG. 2 includes a plurality of vertical walls 72, with the two outermost support walls defining first and second sidewalls 72A and 72B. A horizontal top wall 76 extends across top surfaces of each wall 72 between the first and second sidewalls 72A, 72B. Each wall includes a hole (not shown) therethrough for receiving the sheave pin 68. As will be readily apparent to those of skill in the art, in further embodiments of the upper block frame, other configurations are used, for example, fewer or more vertical walls are included and top or bottom walls are included.

The sheaves 64 are arranged and aligned in parallel within the upper block frame 60. Each sheave includes a hole 80 (shown in FIG. 3) therethrough for receiving the sheave pin 68. The sheave pin 68 defines an axis of rotation 84 for the sheaves 64 within the frame 60. Although seven sheaves 64 are shown in the embodiment illustrated in FIG. 2, it will be readily apparent to those of skill in the art that fewer or more sheaves may be used in the upper block 28.

The upper block assembly 28 illustrated in FIG. 2 includes a pin removal assembly 90 releasably mounted to the upper block 28 for supporting the sheaves 64 and the upper block 28 when the sheave pin 68 is removed from the upper block 28. The pin removal assembly 90 allows the sheave pin 68 to be removed and/or replaced from the upper block 28 without unreeving the wire ropes 54, 56 from the upper block sheaves 64 and sheaves (not shown) of the lower block 30. Further, the pin removal assembly 90 allows the sheave pin 68 to be removed and reinstalled without removing the upper block sheaves 64. During use, the pin removal assembly 90 supports the sheaves 64 within the upper block frame 60 such that the sheave pin is removable from the upper block 28 without unreeving and re-reeving the wire ropes 54, 56 or removing the upper block sheaves 64.

Figure 3:
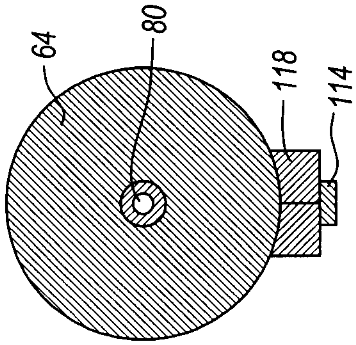
FIG. 3 is a cross-sectional view of the pin removal assembly of FIG. 1 taken along line 3-3 of FIG. 1, and showing a sheave support of the pin removal assembly engaged with a sheave of the upper block.
Figure 4:
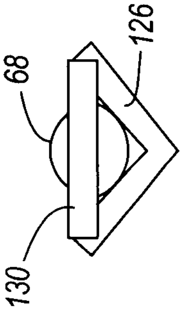
FIG. 4 is an end view of the pin removal assembly of FIG. 1 showing a main pin of the upper block supported by the pin removal assembly before it is inserted into and through the sheaves of the upper block.

In the illustrated embodiment, the pin removal assembly 90 includes a first support bracket 94, a second support bracket 98, a sheave support 102 for supporting the sheaves 64 and a pin support 106 for supporting the sheave pin 68 when the sheave pin 68 is removed from the upper block 28. The first and second support brackets 94, 98 are attached to the first and second sidewalls 72A, 72B, respectively, of the upper block frame 60. The support brackets 94, 98 are either permanently attached or removably attached to the sidewalls 72A, 72B. The sheave support 102 is releasably mounted to the first support bracket 94 and pin support 106 is releasably mounted to the second support bracket 98. In another embodiment, the sheave support 102 and the pin support 106 are releasably mounted to the upper block frame 60 directly. In still another embodiment, the upper block frame 60 includes keeper plates to which the sheave support 102 and the pin support 106 attach, In the illustrated embodiment, the sheave support 102 includes a vertical support arm 110 and a base portion 114. The support arm 110 of the sheave support 102 is mounted at one end to the first support bracket 94. The base portion 114, or beam, is attached to the other end of the support arm 110 and extends substantially perpendicular to the support arm 110. A plurality of wedges 118, or V-shaped supports, are attached to the base position 114 of the sheave support 102. As shown in FIG. 3, each wedge 118 is configured to support one sheave 64 when the pin removal assembly 90 is in use. Each wedge 118 is vertically adjusted with a screw (not shown) to position the wedge 118 to support a sheave 64. In a further embodiment, each wedge, or support, is configured to support more than one sheave. Further, it will be readily apparent to those skilled in the art that the wedge may be comprised of one or two pieces.

In the illustrated embodiment, the pin support 106 includes a vertical first support portion 122 and a horizontal second support portion 126. The first support portion 122 of the pin support 106 is mounted at one end to the second support bracket 98 of the upper block frame 60. The other end of the first support portion 122 is attached to the base portion 114 of the sheave support 102. In another embodiment, the sheave support 102 and the pin support 106 are not attached.

One end of the second support portion 126 is attached to the support portion 122 of the pin support 106. The second support portion 126 extends outward from the upper block frame 60 such that the second support portion 126 is substantially aligned in parallel with the rotation axis 84 defined by the sheave pin 68. The second support portion 126 is V-shaped and configured to support a sheave pin when the sheave pin 68 is removed from the upper block 28 or a new pin is installed into the upper block 28. It will be readily apparent to those skilled in the art that the second support portion may have any configuration or shape suitable for supporting a sheave pin removed from the upper block.

In the illustrated embodiment, a cross bar 130 is attached to the second support portion 126 of the pin support 106. The cross bar 130 supports a pulling/pushing mechanism (not shown) for removing the sheave pin 68 from the upper block 28. One example of a pulling/pushing mechanism is a hydraulic cylinder. In the illustrated embodiment, the mechanism is positioned to pull the sheave pin 68 in order to remove the sheave pin from the upper block 28, and to push the sheave pin 68 in order to install the sheave pin 68 into the upper block 28. In a further embodiment, the mechanism is positioned to push the sheave pin 68 in order to remove the sheave pin 68 from the upper block, and to pull the sheave pin 68 in order to install the sheave pin 68 into the upper block 28. Further, in the illustrated embodiment of the pin support 106, a brace member 134 extends between the second support portion 126 and the second support bracket 98. The brace member 134 prevents the sheave pin 68 from falling from the pin support 106 when the pin 68 is removed from the upper block 28.

The pin removal assembly 90 is not permanently attached to the upper block 28, but is only attached during removal and replacement of the sheave pin 68 relative to the upper block 28. In use, the first and second support brackets 94, 98 are attached to the opposite sidewalls 72A, 72B of the upper block frame 60. The sheave support 102 is mounted to the first support bracket 94. The wedges 118 are positioned and adjusted individually, or as a unit, such that each wedge 118 wedge supports one of the sheaves 64. Next the pin support 106 is mounted to the second support bracket 98. The sheave pin 68 is removed from the upper block 28 by a pulling/pushing mechanism and the pin support 106 supports the sheave pin 68 when it is removed from the upper block 28.

To replace the sheave pin 68 with a new sheave pin (not shown), the sheave pin 68 is removed from the pin support 106 and a new sheave pin is placed in the pin support 106. The new sheave pin is positioned within the upper block 28 to support the sheaves 64 within the upper block 28 by sliding the pin through the holes of the upper block frame 60 and holes 80 of the sheaves 64. During the process of removing and replacing the sheave pin 68, the sheave support 102 supports the sheaves 64 within the upper block frame 60 such that the sheave pin 68 is removable without unreeving the wire ropes 54, 56 from the sheaves 64 or removing the upper block sheaves 64.

It will be readily apparent to those skilled in the art that a pin support is not necessary for supporting sheaves and maintaining the upper block assembly 28 together during removal of a sheave pin. In another embodiment, the first and second support brackets 94, 98 are permanently attached to the upper block frame 60. In still another embodiment, the vertical support arm 110 of the sheave support 102 and the first support portion 12 of the pin support 106 are separately attached to the support brackets 94, 98 relative to the sheave support 102 and pin support 106, respectively.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Various features and advantages of the invention are set forth in the following claims.

What is claimed is:

1. An upper block in combination with a pin removal assembly for an overhead crane comprising:

an upper block including:

a frame including a first sidewall and a second side wall, each sidewall having a hole therethrough;

a plurality of sheaves arranged within the frame, each sheave having a hole therethrough with the holes defining an axis of rotation; and a sheave pin received by the holes of the frame and holes of the sheaves, the sheave pin supporting the sheaves within the frame; and a pin removal assembly releasably mounted to the upper block, the pin removal assembly including:

a sheave support releasably mounted to the first sidewall; and a pin support releasably mounted to the second sidewall, the pin support configured to support the sheave pin when removed from the frame.

2. The upper block in combination with a pin removal assembly of claim 1, and further comprising a first support bracket mounted to the first sidewall wherein the sheave support is releasably mounted to the first support bracket, and a second support bracket mounted to the second sidewall wherein the pin support is releasably mounted to the second support bracket.

3. The upper block in combination with a pin removal assembly of claim 1, wherein the sheave support comprises:

a support arm mounted to the upper block frame; and a base portion attached to the support arm, the base portion configured for supporting the sheaves.

4. The upper block in combination with a pin removal assembly of claim 3, wherein the base portion includes a plurality of wedges, each wedge supporting at least one of the sheaves.

5. The upper block in combination with a pin removal assembly of claim 1, wherein the pin support comprises:

a first support portion mounted to the second support bracket; and a second support portion extending outward from the respective sidewall of the upper block frame and attached to the first support portion, the second support portion substantially aligned in parallel with the rotational axis for the sheaves and configured to support the sheave pin when the sheave pin is removed from the frame.

6. The upper block in combination with a pin removal assembly of claim 1, and further comprising a cross bar attached to the pin support for supporting a mechanism for removing the sheave pin from the upper block.

* * * * *